United States Patent
Langford

[11] Patent Number: 5,956,462
[45] Date of Patent: Sep. 21, 1999

[54] DOMESTIC ELECTRIC ENERGY CONTROL

[75] Inventor: Newton Langford, North Balwyn Victoria, Australia

[73] Assignee: Aquabeat Pty Ltd., Hastings, Australia

[21] Appl. No.: 08/936,816

[22] Filed: Sep. 24, 1997

[30] Foreign Application Priority Data

Sep. 26, 1996 [AU] Australia ................................. P02597
Jan. 31, 1997 [AU] Australia ................................. P04863

[51] Int. Cl.⁶ .................................. F24H 1/18; H02J 1/00
[52] U.S. Cl. ............................ 392/449; 392/498; 307/38
[58] Field of Search ........................... 392/449, 450–454, 392/498; 340/870.17; 307/31–35, 38–40, 96–97

[56] References Cited

U.S. PATENT DOCUMENTS

| | | |
|---|---|---|
| 2,784,291 | 3/1957 | Harney . |
| 4,181,950 | 1/1980 | Carter, II ................................. 364/492 |
| 4,348,668 | 9/1982 | Gurr et al. ........................ 340/825.06 |
| 4,540,875 | 9/1985 | Buttolph, III . |
| 4,568,821 | 2/1986 | Boe . |
| 4,587,401 | 5/1986 | Ekman . |
| 4,888,495 | 12/1989 | Feron et al. . |
| 5,067,170 | 11/1991 | Nagashima et al. ..................... 392/461 |
| 5,168,170 | 12/1992 | Hartig ....................................... 307/35 |

FOREIGN PATENT DOCUMENTS

| | | |
|---|---|---|
| 33728/84 | 9/1984 | Australia . |
| 1203568 | 4/1986 | Canada . |
| 884423 | of 0000 | European Pat. Off. . |
| 2428213 | 1/1980 | France . |
| 2465389 | 3/1981 | France . |
| 2552210 | 3/1985 | France . |

*Primary Examiner*—Teresa Walberg
*Assistant Examiner*—Thor. S. Campbell
*Attorney, Agent, or Firm*—Pollock, Vande Sande & Amernick

[57] ABSTRACT

An electric power distribution system that utilises radio signals from the power distributor to an appliance such as a water heater 1, to inform via a receiver 12, a micro processor 10 of the energy priority rating of the power distributor. The water heater has an array of temperature sensors 5 that determines the average temperature of the tank and enables the microprocessor 10 to generate an energy needs rating for the water heater. The microprocessor is programmed with a decision algorithm that uses the needs and priority ratings to either switch the appliance on or off.

5 Claims, 2 Drawing Sheets

DOMESTIC ELECTRIC ENERGY CONTROL

This invention relates to control of domestic electric heaters such as electric storage heaters and water heaters.

Electric heating appliances are major consumers of electric power and power, utilities have attempted to address the problem of controlling peak demand by encouraging off peak heating of such appliances with reduced tariffs. However this often leads to the inconvenience of hot water or heating not being available when it is needed. A consequence has been that consumers switch from using electric power to a more demand responsive energy source such as gas for hot water and space heating. One means of dealing with this problem has been for the power utilities to develop a more demand responsive distribution system. This usually entails using high frequency signals sent over the power lines to activate or deactivate heaters at individual sites. Examples of this approach are disclosed in Canadian patent 1203568, U.S. Pat. No. 4,888,495 and WO95/22190. U.S. Pat. No. 4,540,875 addresses the control of space heating demand by sensing ambient temperature at a central control point, and high frequency signals are superimposed on the normal power line voltage to provide operating instructions to the individual space heaters. Difficulty has been encountered in sending high frequency signals over power lines because of noise interference. This problem has been addressed in the prior art by using telephone lines to send signals to power substations which then send signals over powerlines to remote appliances. These attempts have all aimed at better control of demand from the power utility's perspective.

The other approach has been to address control from the consumers' perspective by providing control of power consumption at the heater depending on its energy need. These attempts all try to utilize the cheaper off peak power without compromising the need for instant heating or hot water. U.S. Pat. No. 4,568,821 provides a display and control panel located inside the home and senses the temperature of the water in the hot water tank to enable the consumer to choose the most economical means of obtaining the needed hot water. Most attempts of this kind have tried to automate the switching decisions. U.S. Pat. No. 4,948,948 discloses a water tank with heating elements of different power ratings disposed at different heights in the tank, and a timer switches on the elements individually at the most economical time for each element depending on the power utility's. Another approach based on timer control at the tank is to sense the tank temperature and switch on the heating elements to reheat the tank to a predetermined temperature. Australian specification 33728/84 discloses a tank with several thermostats and several heating elements of different power ratings. Depending on the temperature gradient of the tank as sensed by the thermostats an appropriate element is chosen so that the tank can reach the specified temperature during the allocated off peak period. Thus a tank with only a small heating demand will use the low power element and the higher power rated element will be switched on if the heat demand is high. French patent 2552210 utilises a timer, a thermostat and an element in a water heater and is arranged so that if the water temperature is above a certain value the heating element is not switched on. These systems are still dependent on operating within a preset time period and do little to alleviate the problem of all electric water or space heaters being switched on at the same time. French patent 2465389 discloses a storage heater control which senses the temperature and the temperature setting of the heater, and an electric circuit responsive to this data is connected to the power line and acts to delay the switching on of the heater in response to a signal received over the power line.

It is an object of this invention to provide a water or space heater with a controller which improves the economy and/or convenience of these heaters for the consumer and at the same time allow the power utilities to smooth out the demand curve.

SUMMARY OF THE INVENTION

To this end the present invention a power distribution system for electric appliances comprising
   a) a central controller having means to monitor power consumption,
   b) transmitter to send signals containing data used in deciding to switch appliances on or off,
   c) sensing means on the appliance, and to sense the temperature of the appliance
   d) a receiver connected to a data processor to receive signals from said transmitter,
   e) said data processor being connected to said appliance programmed to process the temperature data generated by said sensing means and the operation settings of the appliance to generate an energy need category code for the appliance and programmed to decide whether to switch the appliance on or off based on said energy need category and the data contained in the signals received by said receiver.

The advantage of this arrangement is that for the first time a power utility can provide power at a time which suits its load curve to those appliances most in need and thus come close to the ideal of providing instant heat or hot water at economical tariff rates. This invention reduces the risk that a consumer will run out of hot water or have inadequate storage heating.

In another embodiment the present invention provides a premises power controller which includes
   1) a set of temperature sensors for each electrical appliance to be controlled,
   2) a data processor connected to each said appliance programmed to process the temperature data and the operation settings of the appliance to generate an energy need category code for the appliance,
   3) a receiver to receive transmitted instructions for appliances in a particular energy need category, and
   4) switching means to turn said appliances on or off.

This invention is especially applicable to electric water heaters and to electrically powered climate control systems such as electric storage heaters that can be preferentially operated during off peak periods. A water heater according to this invention may incorporate a series of vertically arrayed temperature sensors in its internal wall and these sensors will be connected to a controller incorporating a data processor and a signal receiver. The data processor is programmed to analyze the temperature profile of the tank, compare it to the selected temperature setting and assign the tank an energy need rating and then identify the tank as being in a particular category. The number of energy need categories can be as large as is manageable and will correspond to a time/energy increment used by the power station. With this arrangement a single power rated element will be sufficient and the expense of a multi element tank can be avoided.

For the input of power to be most responsive to consumers hot water needs it is desirable that an input of say 10% of the energy required heats 10% of the water to the desired temperature[eg >50° C.], rather than heating all the water and increasing the temperature by 10% of the difference between the cold water and the desired temperature. To do this the tank, could have an element at the top of the tank but it is preferred to use a tank with an element at the base of the tank and a canopy and flue over the element to guide the heated water to the top of the tank adjacent the hot water outlet. Heaters of this kind which produce a layer of hot water in the upper region of the tank have been described in patents such as U.S. Pat. Nos. 2,784,291, 4,587,401 and European 384423. By utilizing this structure and a more responsive heating control a smaller volume tank can be used thus saving capital costs.

Water heaters of this invention provide a viable alternative to gas fired water heaters in that operating costs are lower when off peak rates can be used and the capital cost of the tank is equivalent or cheaper than an equivalent gas water heater when only one element is incorporated. From the power utility's view point the preferred signal media is radio communication such as used in a paging system or carried on a radio station's signal. Pager networks already have some of the addressing protocols that would need to be included in a radio broadcaster's signal. AM signals are preferred because of their greater coverage but an FM signal is also viable. Because of the simplicity of the system of this invention the data required to be sent is small and the duration of any signal is short. If all appliances fitted with a controller also have an account, the utility has two parameter ranges to use to reduce the number of appliances that are turned on at any one time as a small range of accounts can be paged and only those in the selected energy need category will be switched on. This increased choice enables the power engineer to smooth the load curve with consequential savings in operating costs and in consumer satisfaction.

BRIEF DESCRIPTION OF THE DRAWINGS

A preferred form of the invention will now be described with reference to the drawings in which.

DESCRIPTION OF THE PREFERRED EMBODIMENTS

Figure 1:
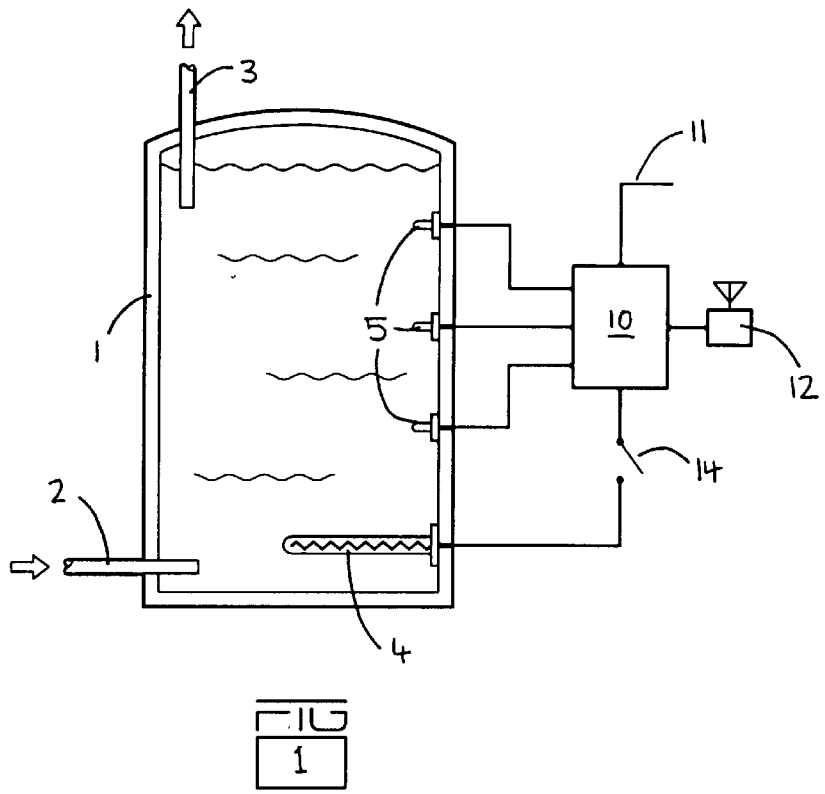
FIG. 1 is a schematic representation of a water heater in accordance with the present invention.

Referring to FIG. 1 the water tank 1 has a water inlet 2 and a water outlet 3 and a heating element 4 connected via switch 14 to the power cable 11. The tank is one in which water is stratified according to its temperature with the hottest water at the top. Tanks of this kind are known from U.S. Pat. Nos. 2,784,291, 4,587,401 and European 384423 each of which is incorporated herein by reference. Particularly preferred is the arrangement of the element and the heated water dispersal flume shown in U.S. Pat. No. 2,784,291. Instead of enclosing the element in a cylindrical casing having apertures in its under side, a half cylinder can be used to guide the heated water into the vertical pipe so that the hottest water always lies at the top of the tank adjacent to the hot water outlet. The tank itself can be a conventional metal tank or, for longer life and resistance to corrosion, a moulded plastic tank may be used in conjunction with a pressure transfer module that converts the heated water, drawn from the hot water outlet of the tank, to mains water pressure.

Arrayed vertically on the internal wall of the tank at predetermined heights are three thermistors or thermostats 5 which measure the temperature of the water at that level in the tank. There can be as many temperature sensors as is economically viable. Three sensors give a reading of the temperature profile of the tank indicating the amount of warmest water at the top that can be drawn off and the temperature of the water at lower levels, which will replace it. This data allows a calculation to be made by the data processor 10 of the amount of power required to heat the whole tank to the desired temperature.

Connected to the programmed processor 10 is a radio receiver 12 tuned to the paging bandwidth used by the power utility. The processor 10 can be located on the water tank but is preferably located on the power board or in an appliance control panel inside the premises.

An alternative to having the three sensors 5 replace them with one sensor, which will measure the average temperature of all the water in the tank. This can be achieved by using a resistance wire extending the height of the tank internally so that once the wire is calibrated the resistance of the wire will give a measure of the average temperature [Tav] of the tank. Then if the temperature at the top of the tank is T1, the temperature at the bottom is T2 the depth of the layer of hot water is "x" then from the equation Tav= xT1+(1−x)T2 a value of x can be determined. Knowing the value of "x", the volume of water in the tank and the power rating of the element it is possible to determine the time of power input required to heat the whole tank to the desired temperature. This time can be broken down into increments such as quarters or tenths of an hour, and the tank can then be identified or categorized according to the number of increments it needs.

The microprocessor on the tank or at the premises can place the tank into a need category. One method for deciding when to switch on the appliance, is for the power utility to simply identify in its signal what need categories can be switched on. This assumes an analysis of the utility's available power has been made. Another approach to assist in automating the decision to switch an appliance on is for the signal sent by the utility to simply identify the utility's priority, and the appliance can be programmed to respond based on a decision algorithm and its need rating. Table 1 sets out a possible priority and needs rating.

TABLE 1

| Utility's Priority [P] | P number | Water heater Need [N] | N number |
| --- | --- | --- | --- |
| Emergency - No power | 0 | All cold - no hot water | 0 |
| Only most urgent | 1 | 5% hot water | 1 |
| most needy | 2 | 15% hot water | 2 |
| needy | 3 | 30% hot water | 3 |
| medium priority | 4 | 50% hot water | 4 |
| Just a top up | 5 | 65% hot water | 5 |
| who can use heat | 6 | 80% hot water | 6 |
| Electricity to Dump | 7 | 100% hot - no need | 7 |

The logic in the microprocessor to make the switching decision depends on the value of X where $X=P-N$ If X is greater than or equal to 1 the appliance is turned on and if X is 0 or a negative number the appliance's heater is turned off.

Figure 3:
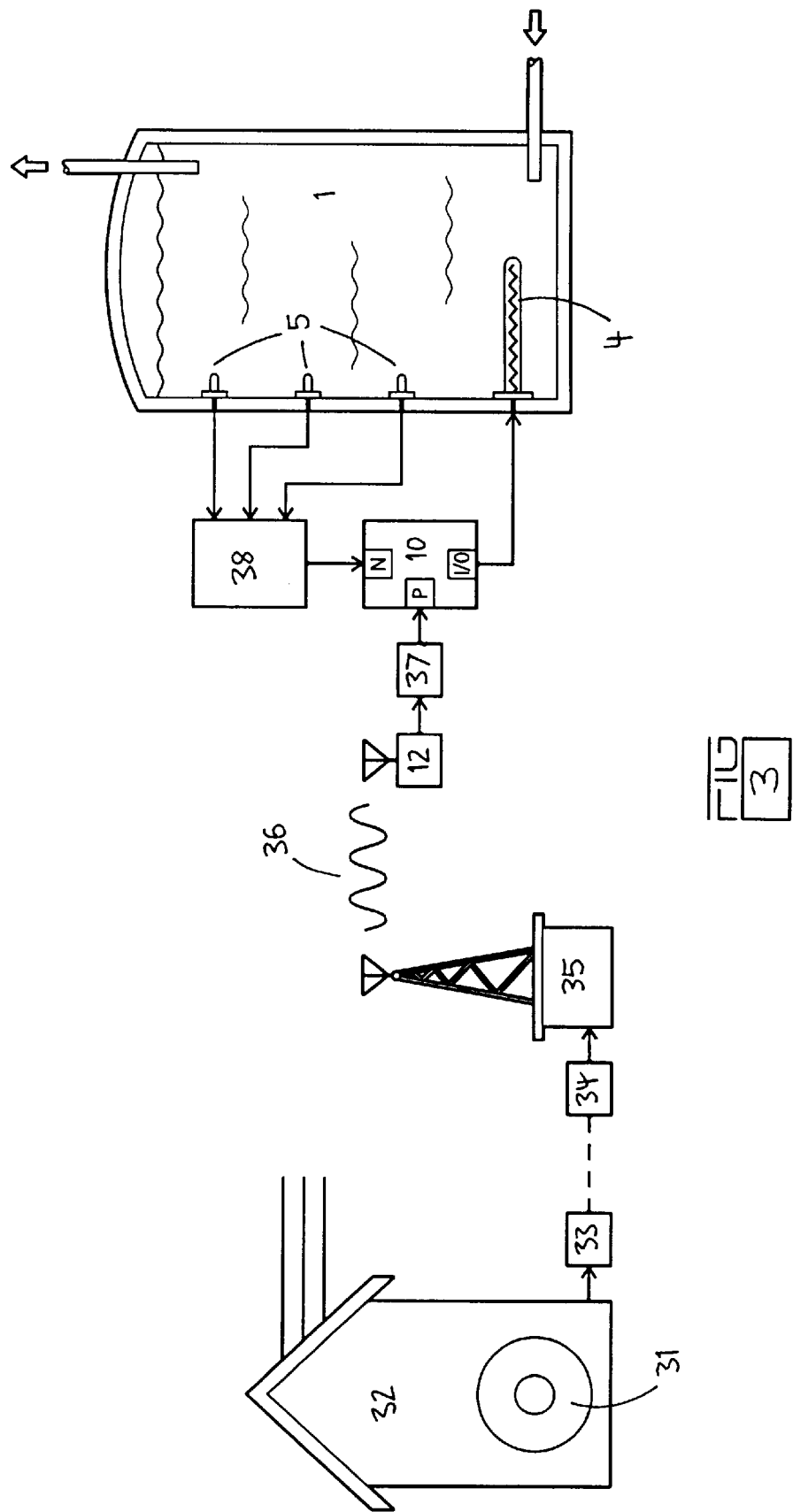
FIG. 3 is a schematic representation of the total system from the power distributor to the appliance.

The operational sequence with reference to FIG. 3 is:

1) Power distributor 32, [drawing power from generator 31]

assesses excess power capacity and generates a signal which is essentially a P number;

2) the signal is transferred from distributor 32 to a broadcaster 35 preferably by dedicated modems 33 at the distributor and 34 at the broadcaster;

3) the signal is converted to a suitable transmission signal 36 for a radio or pager broadcast 4) the signal is broadcast; from broadcaster 35 to the power distributor's geographic territory; different broadcast stations could target different cells or alternatively the signal could include a cell address which introduces a further choice in the switching decision;

5) the signal is received on a set frequency by the radio receiver 12 or pager channel;

6) if necessary the signal is filtered by filter 37 and passed to the microprocessor 10 as a TTL signal;

7) the signal is checked for validity and completeness and becomes the P number stored in the microprocessor memory;

8) a multiplexer 38 is constantly transferring readings, from the sensors 5 and data relating to the appliance 1, to the microprocessor 10, which in turn is constantly generating an N number from the sensor readings and the appliance settings; and 9) the decision algorithm [X=P−N] is run regularly using the most current P and N values to generate a value for X and to then activate the electrical element 4 or switch it off.

As well as sending a priority signal the appliances can be pre programmed to receive other signals. If an appliance at a particular billing address is given an identity programmed into the microprocessor, then the power utility can broadcast a signal addressed to a particular appliance and switch it off if it is malfunctioning or the premises is in arrears in paying its accounts.

Figure 2:
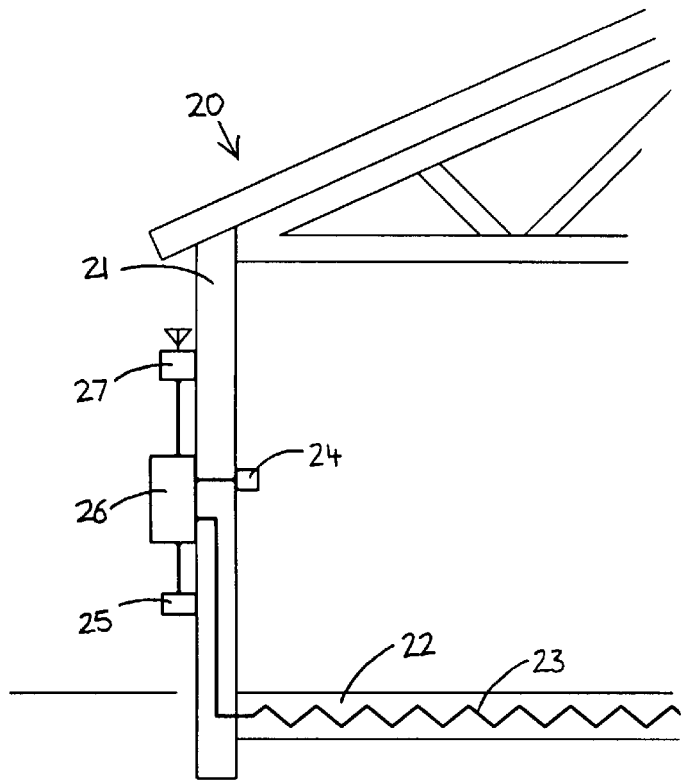
FIG. 2 is a schematic representation of an in floor space heating arrangement according to this invention.

An electric storage heating system is illustrated in FIG. 2 which is a sectional view of part of a building 20 having an external wall 21 and a floor 22. The floor contains in floor heating such as element 23 in a concrete slab. At least one temperature sensor 24 is located in the interior of the building and an exterior temperature sensor 25 is located on the external wall. The sensors 24 and 25 and the element 23 are all connected to a data processor 26 which in turn is connected to a radio receiver 27. The programmed processor 26 compares the desired temperature setting to the internal and external temperature readings and is programmed to determine the amount of power required to attain the desired temperature. The processor 26 can be located in the interior of the building and can include the temperature setting control.

In both embodiments shown in FIGS. 1 and 2 the processor places the water heater or space heater in a power need category which again can be the number of power increments the heater needs. When a signal is received the processor reads the incoming instruction for the category code and responds appropriately if it matches the appliance's category. Because of the differences in the heating responses a very different control program is needed for a storage heater as opposed to a water heater.

One controller can be used for more than one appliance and can be connected to both water heater(s) and storage heater(s) as well as any other electrically powered appliance that can be operated in off peak or lower power demand periods such as industrial machinery that needs to be switched on for a warm up period prior to being fully operational. The processor can be programmed to identify the appliance and respond to signals which identify appliance type and energy need category. As mentioned above a different control program involving a different algorithm, sensors and settings will be needed for each appliance. This further refines the degree of incremental power that the power engineer at the power utility can add or subtract from the power curve. Such control means the power utility can spread the power distribution more evenly over the off peak periods. The appliances in most need would be turned on first. For example in the major overnight off peak period the time lapse between the power consumption peaks is about 12 hours and the water heaters most in need would have a demand for 8 hours of power. The power station engineer would respond to the fall in power demand from the evening peak along the lines of the following scenario:

1. turn on all water heaters needing 32 quarter hours of power;

2. turn on all water heaters needing 31 quarter hours of power . . . the interval between commands will be in response to the rate of fall in demand and successive less needy categories would be switched on 3. after the first 40 minute interval the heaters switched on at 1 could be turned off for 20 minutes to extend the eight hours of heating needed over the expected 12 hours between the evening and morning peaks.

The signals that are sent out need not be confined to one category but would indicate for all categories whether at that point in time they should be switched on or off. In this way even if the power demand is so great that not all water heaters can be turned on during the 12 hour period between the evening and morning peaks all those in greatest need would have available hot water. The need for further heating can be monitored during the period between daytime peaks and again used to smooth the demand curve during the day time. When reference is made to smoothing the power demand curve it is intended that the power utility can use the control of water heaters to reduce the variation in power demand between the periods of highest and lowest demand in the most economical way.

A critical aspect of this invention is that signals need only be in one direction namely from the power distributor to the consumer appliance. However there are other functions related to electrical appliances for which a transmitter as well as a receiver would be useful. These include:

1) reading of electricity, water, and gas meters by the microprocessor and then at pre-programmed intervals transmitting the meter readings to the receiver of the appropriate distributor;

2) reading and transmission of signals from sensor systems such as intrusion detectors, fire and smoke detectors and medical alert systems for the frail and elderly;

3) basic electronic funds transfer for payment of premises services such as council rates, water rates, gas, electricity, telephone etc and could be used in conjunction with programmable smart memory cards to receive credits from social welfare payments or bank transfers.

Thus by adding a transmitter to the microprocessor based receiver of this invention it would be relatively easy to add many other functions.

From the above it can be seen that the present invention uniquely reduces the likelihood that a consumer will be without hot water or will have inadequate stored heat and at the same time enables the power utility to incrementally adjust the power demand curve to control production costs.

Having thus described my invention, I claim:

1. A power distribution system for electric water heaters comprising a) a plurality of electric water heaters each including a storage tank, a heating element, a thermostat, a set of operational settings and a power switch;
b) a central controller at a power utility having means to monitor power consumption and calculate a power availability priority;
c) a transmitter associated with said central controller for broadcasting signals containing data representative of said power availability priority calculated at said central controller;
d) sensing means on each of said water heaters for sensing the temperature of the water stored in the storage tank of said water heater;
e) a data processor connected to said water heater programmed to process water temperature data generated by said sensing means and said operational settings of said water heater to generate an energy need category code for said water heater; and
f) a receiver connected to said data processor to receive said power availability priority data signals sent from said transmitter;
g) said data processor connected to said water heater being programmed in accordance with a predetermined decision algorithm to decide whether to switch the water heater on or off jointly based on both said energy need category code generated by said data processor connected to said water heater and the power availability priority data by said receiver.

2. A power distribution system as claimed in claim 1 wherein said predetermined decision algorithm is $X=P-N$, wherein P is a power availability priority category code transmitted from said central controller and N is said energy need category code generated by said data processor connected to said water heater, a value of X greater than or equal to 1 resulting in said power switch at the water heater being switched on and a value of X equal to zero or a negative number resulting in said power switch at the water heater being switched off.

3. A water heater controller for a water heater which includes a storage tank, a heating element, a set of temperature sensors in a wall of the water heater storage tank, a set of operational settings and a water heater power switch, said controller including
a) a data processor connected to said water heater programmed to process temperature data provided from said sensors and said operational settings of the water heater to generate an energy need category code for the water heater; and
b) a receiver connected to said water heater to receive power availability data from a remote power utility to be used by said data processor;
c) said data processor connected to said water heater being programmed to decide how to operate said power switch jointly based on both said energy need category code calculated for the water heater and said power availability data received by said receiver from the remote power utility.

4. A water heater controller as claimed in claim 3 wherein said data processor connected to said water heater is programmed to operate in accordance with a decision algorithm $X=P-N$, wherein P is a priority category established by the remote power utility and provided in said power availability data from the remote power utility, and N is said energy need category code generated by said data processor connected to said water heater; a value of X greater than or equal to 1 resulting in said water heater power switch being switched on, and a value of X equal to zero or a negative number resulting in said water heater power switch being switched off.

5. A water heater controller as claimed in claim 4 wherein said water storage tank has said heating element located in a lower portion of said storage tank and a hot water outlet located in an upper part of said storage tank, said storage tank being arranged to have stratified layers of water of different temperatures with the hottest strata being adjacent said hot water outlet.

\* \* \* \* \*